(12) United States Patent
Yoshida et al.

(10) Patent No.: US 12,168,437 B2
(45) Date of Patent: Dec. 17, 2024

(54) DISPLAY DEVICE FOR A VEHICLE, DISPLAY METHOD AND PROGRAM

(71) Applicant: TOYOTA JIDOSHA KABUSHIKI KAISHA, Toyota (JP)

(72) Inventors: Yuki Yoshida, Toyota (JP); Ryo Ogata, Toyota (JP); Junji Miyazaki, Nagoya (JP); Koji Kimura, Nagoya (JP); Satoaki Takabatake, Nissin (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 17/393,105

(22) Filed: Aug. 3, 2021

(65) Prior Publication Data
US 2022/0063613 A1    Mar. 3, 2022

(30) Foreign Application Priority Data
Aug. 31, 2020 (JP) .................................. 2020-146393

(51) Int. Cl.
*B60W 30/12* (2020.01)
*B60K 35/00* (2006.01)
(Continued)

(52) U.S. Cl.
CPC .............. *B60W 30/12* (2013.01); *B60K 35/00* (2013.01); *B60W 30/18163* (2013.01);
(Continued)

(58) Field of Classification Search
CPC ........... B60W 30/12; B60W 30/18163; B60W 60/00; B60K 35/00; B60K 2370/1529;
(Continued)

(56) References Cited

U.S. PATENT DOCUMENTS 8,239,131 B2 * 8/2012 Kindo ................ G01C 21/3647
701/436
9,205,816 B2 * 12/2015 Kobana .................. B60K 28/06
(Continued)

FOREIGN PATENT DOCUMENTS

CN        105976641 A  *  9/2016 ............. B60Q 1/085
CN        109074740 A     12/2018
(Continued)

OTHER PUBLICATIONS

CN 105976641 A English translation (Year: 2016).*
(Continued)

*Primary Examiner* — Angelina M Shudy
(74) *Attorney, Agent, or Firm* — Oliff PLC

(57) ABSTRACT

A display device includes a display section provided in a cabin of a vehicle that is capable of autonomous driving, memory, and a processor connected to the memory. The processor is configured to, before conducting a lane change by autonomous driving from a first lane in which the vehicle is running to a second lane that is distinct from the first lane, display a lane display and a confirmation display at the display section. The lane display corresponds to the first lane and the second lane. The confirmation display relates to confirmation of a condition of the second lane.

17 Claims, 11 Drawing Sheets

(51) Int. Cl.
*B60W 30/18* (2012.01)
*B60K 35/23* (2024.01)
*B60K 35/28* (2024.01)
*B60W 50/14* (2020.01)

(52) U.S. Cl.
CPC .............. *B60K 35/23* (2024.01); *B60K 35/28* (2024.01); *B60K 2360/175* (2024.01); *B60W 2050/146* (2013.01)

(58) Field of Classification Search
CPC ........ B60K 2370/175; B60K 2050/146; G01C 21/3658
See application file for complete search history.

(56) References Cited

U.S. PATENT DOCUMENTS

| | | | | |
|---|---|---|---|---|
| 10,252,726 B2* | 4/2019 | Emura | | B60W 30/18163 |
| 11,066,073 B2* | 7/2021 | Ishioka | | B60W 30/09 |
| 11,077,862 B2* | 8/2021 | Mimura | | B60W 50/08 |
| 11,320,652 B2* | 5/2022 | Suzuki | | B60K 35/00 |
| 11,465,626 B2* | 10/2022 | Wang | | B60W 50/14 |
| 2008/0249710 A1* | 10/2008 | Takada | | G01C 21/3658 701/417 |
| 2012/0173069 A1* | 7/2012 | Tsimhoni | | B60W 30/18163 701/25 |
| 2012/0296561 A1* | 11/2012 | Park | | G08G 1/096775 701/119 |
| 2013/0110394 A1* | 5/2013 | Irie | | G01C 21/3658 701/461 |
| 2013/0241747 A1* | 9/2013 | Hatakeyama | | B60K 35/00 340/901 |
| 2014/0063064 A1* | 3/2014 | Seo | | G08G 1/096741 345/633 |
| 2014/0067250 A1* | 3/2014 | Bone | | G08G 1/167 701/301 |
| 2014/0236473 A1* | 8/2014 | Kondo | | G01C 21/3647 701/400 |
| 2014/0297181 A1* | 10/2014 | Kondo | | G08G 1/09626 701/532 |
| 2015/0032290 A1* | 1/2015 | Kitahama | | G08G 1/16 701/1 |
| 2015/0203126 A1* | 7/2015 | Kobana | | B60W 50/12 701/1 |
| 2016/0152184 A1* | 6/2016 | Ogawa | | G09G 5/373 345/589 |
| 2016/0200249 A1* | 7/2016 | Boyd | | B60K 35/60 340/459 |
| 2016/0300491 A1* | 10/2016 | Fukuda | | G08G 1/167 |
| 2016/0304126 A1* | 10/2016 | Yamaoka | | B60K 35/00 |
| 2016/0325676 A1* | 11/2016 | Yamada | | G06V 20/58 |
| 2016/0327947 A1* | 11/2016 | Ishikawa | | B60W 50/14 |
| 2018/0058879 A1* | 3/2018 | Tayama | | B60W 60/0011 |
| 2018/0157038 A1* | 6/2018 | Kabe | | G02B 27/0101 |
| 2018/0178802 A1* | 6/2018 | Miyata | | B60W 30/095 |
| 2018/0215388 A1* | 8/2018 | Takae | | B60R 21/00 |
| 2018/0225975 A1* | 8/2018 | Park | | G05D 1/0212 |
| 2018/0345959 A1* | 12/2018 | Fujii | | B60W 30/0953 |
| 2018/0348756 A1* | 12/2018 | Mimura | | B60K 35/00 |
| 2019/0009784 A1* | 1/2019 | Takeda | | B60W 30/18154 |
| 2019/0071075 A1* | 3/2019 | Mimura | | G06V 20/584 |
| 2019/0106118 A1* | 4/2019 | Asakura | | B60W 30/182 |
| 2019/0144004 A1* | 5/2019 | Mimura | | G01C 21/3635 701/28 |
| 2019/0176831 A1* | 6/2019 | Moon | | B60W 50/14 |
| 2019/0217863 A1* | 7/2019 | Jung | | B60W 30/0956 |
| 2019/0248287 A1* | 8/2019 | Ono | | G02B 27/0101 |
| 2019/0283770 A1* | 9/2019 | Kubota | | B60W 30/18163 |
| 2019/0294895 A1* | 9/2019 | Kleen | | G02B 27/0101 |
| 2019/0315348 A1* | 10/2019 | Mimura | | B60W 30/09 |
| 2019/0329778 A1* | 10/2019 | D'sa | | B62D 15/0255 |
| 2019/0329779 A1* | 10/2019 | D'sa | | G06N 20/20 |
| 2020/0079379 A1 | 3/2020 | Mimura | | |
| 2020/0082793 A1* | 3/2020 | Ichinokawa | | G09G 5/38 |
| 2020/0086890 A1* | 3/2020 | Ikeda | | G09G 5/37 |
| 2020/0094875 A1* | 3/2020 | Mimura | | B62D 15/0265 |
| 2020/0180636 A1* | 6/2020 | Oh | | B60Q 1/346 |
| 2020/0219398 A1* | 7/2020 | Shimizu | | G06T 3/4038 |
| 2020/0269842 A1* | 8/2020 | Kato | | B60W 50/02 |
| 2020/0339147 A1* | 10/2020 | Hayakawa | | B60K 35/00 |
| 2020/0398849 A1* | 12/2020 | Kanoh | | G08G 1/16 |
| 2021/0034063 A1* | 2/2021 | Oguro | | B60W 30/09 |
| 2021/0146943 A1* | 5/2021 | Oniwa | | B60R 21/00 |
| 2021/0403021 A1* | 12/2021 | Kimura | | B60W 30/08 |
| 2022/0042813 A1* | 2/2022 | Ko | | G01C 21/3647 |
| 2022/0063613 A1* | 3/2022 | Yoshida | | B60K 37/06 |
| 2022/0070638 A1* | 3/2022 | Takabatake | | H04W 4/46 |
| 2022/0118983 A1* | 4/2022 | Yagyu | | G08G 1/16 |
| 2022/0126882 A1* | 4/2022 | Oh | | B60W 30/18163 |
| 2022/0172652 A1* | 6/2022 | Yagyu | | G08G 1/16 |
| 2022/0198198 A1* | 6/2022 | Marcotte | | G01C 21/3822 |
| 2022/0203834 A1* | 6/2022 | Nakao | | G02B 27/0101 |
| 2022/0212689 A1* | 7/2022 | Nakao | | G08G 1/0962 |
| 2022/0228881 A1* | 7/2022 | Im | | B60K 35/00 |
| 2022/0242435 A1* | 8/2022 | Mihara | | B60K 35/00 |
| 2022/0274646 A1* | 9/2022 | Shimanaka | | G08G 1/163 |
| 2022/0297695 A1* | 9/2022 | Mahajan | | B60W 30/18163 |
| 2022/0306126 A1* | 9/2022 | Kitagawa | | B60W 30/18163 |
| 2022/0315027 A1* | 10/2022 | Behring | | B60K 35/00 |
| 2022/0324473 A1* | 10/2022 | Gläser | | B60W 50/08 |
| 2022/0340166 A1* | 10/2022 | Kume | | B60K 35/29 |
| 2023/0001813 A1* | 1/2023 | Yokoyama | | B60L 53/38 |
| 2023/0087958 A1* | 3/2023 | Ogata | | G08G 1/167 701/70 |
| 2023/0182572 A1* | 6/2023 | Fujino | | B60W 60/0059 701/36 |
| 2023/0331231 A1* | 10/2023 | Mujumdar | | B60W 60/001 |
| 2023/0339470 A1* | 10/2023 | Hay | | B60W 60/001 |
| 2024/0019696 A1* | 1/2024 | Hayashi | | G09G 5/399 |
| 2024/0083438 A1* | 3/2024 | Su | | B60W 50/14 |
| 2024/0093464 A1* | 3/2024 | Sadilek | | G05B 13/027 |
| 2024/0177362 A1* | 5/2024 | Tsuda | | G06T 11/00 |
| 2024/0181879 A1* | 6/2024 | Nose | | B60W 30/12 |
| 2024/0190247 A1* | 6/2024 | Tsuda | | G06V 20/588 |

FOREIGN PATENT DOCUMENTS

| | | | | |
|---|---|---|---|---|
| CN | 110895417 A | | 3/2020 | |
| CN | 110920521 A | | 3/2020 | |
| DE | 102010022620 A1 * | | 12/2011 | B60K 35/00 |
| EP | 3 269 609 A1 | | 1/2018 | |
| JP | 2017-084112 A | | 5/2017 | |
| JP | 2017218001 A * | | 12/2017 | |
| JP | 2020-042612 A | | 3/2020 | |
| JP | 2020-044988 A | | 3/2020 | |
| WO | 2017/158768 A1 | | 9/2017 | |
| WO | WO-2019189515 A1 * | | 10/2019 | B60K 35/00 |

OTHER PUBLICATIONS

JP-2017218001-A machine translation (Year: 2017).*
WO-2019189515-A1 machine translation (Year: 2019).*
DE-102010022620-A1 machine translation (Year: 2010).*

* cited by examiner

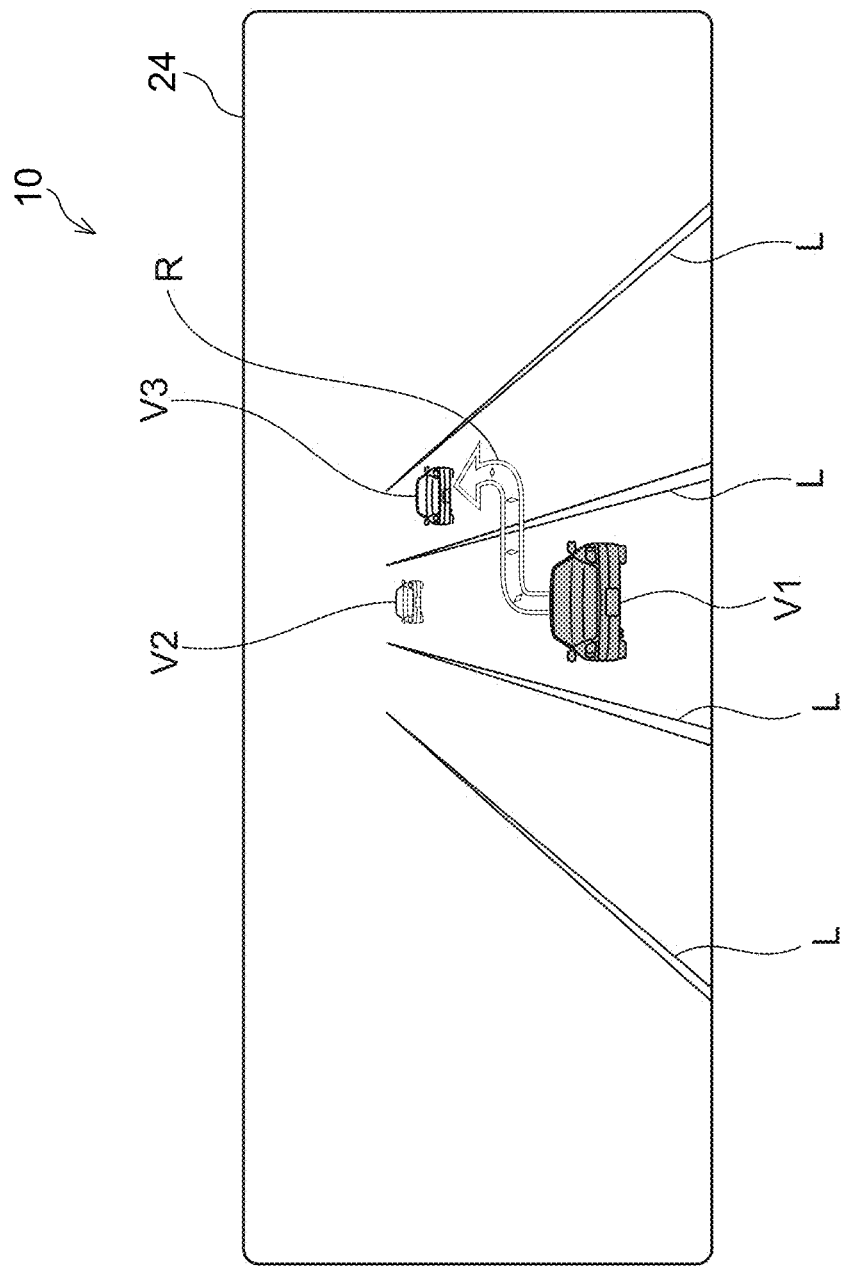

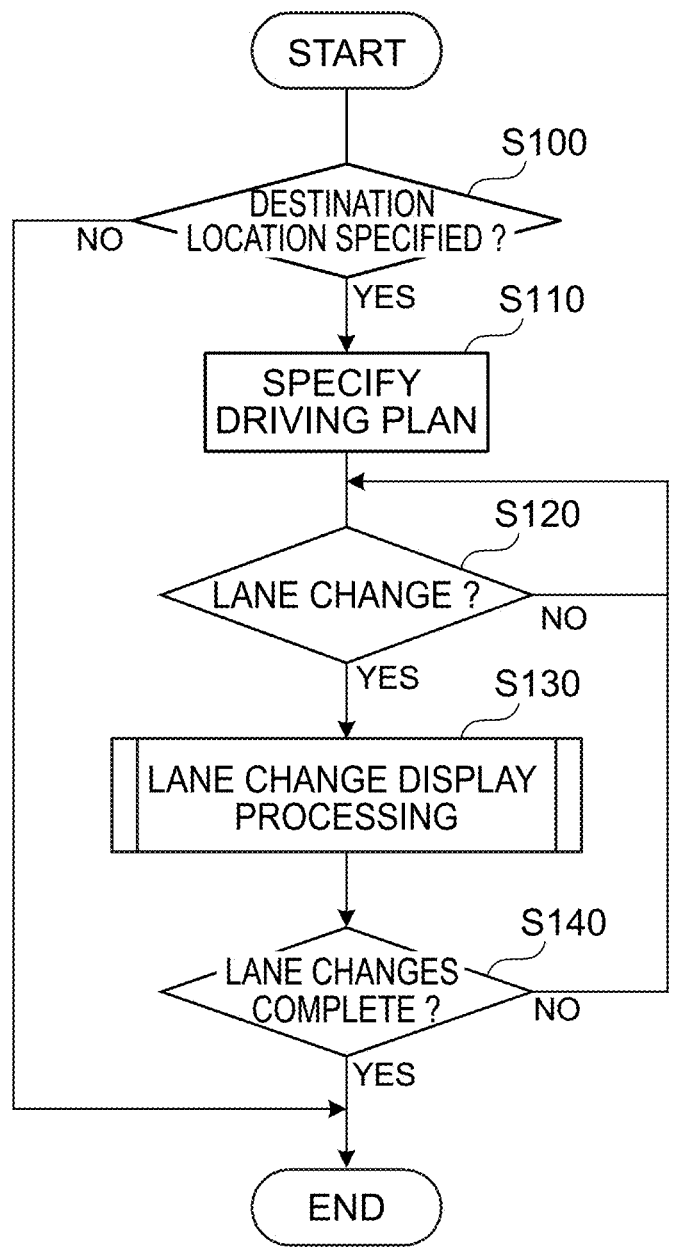

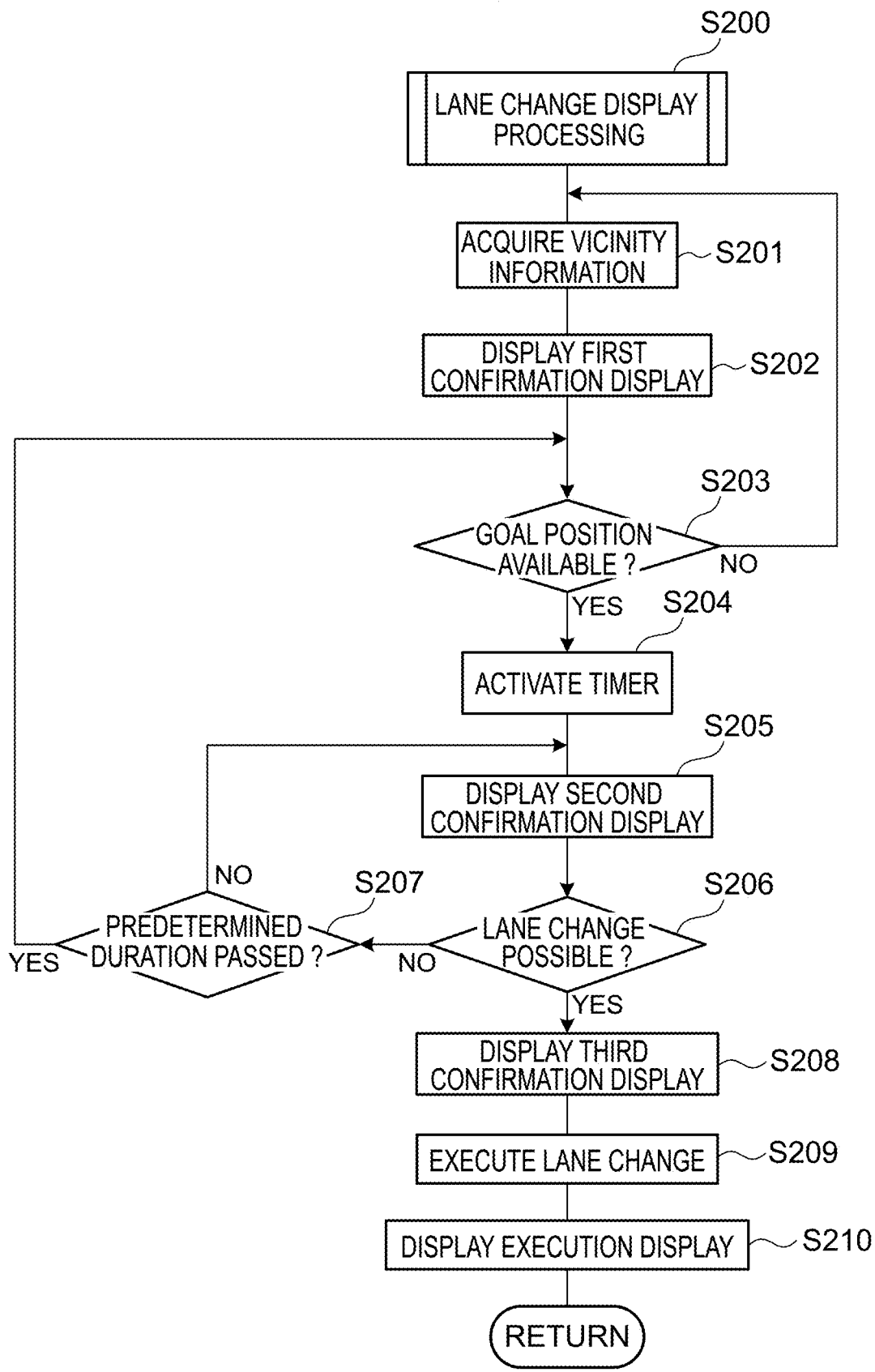

DISPLAY DEVICE FOR A VEHICLE, DISPLAY METHOD AND PROGRAM

CROSS-REFERENCE TO RELATED APPLICATION

This application is based on and claims priority under 35 USC 119 from Japanese Patent Application No. 2020-146393 filed on Aug. 31, 2020, the disclosure of which is incorporated by reference herein.

BACKGROUND

Technical Field

The present disclosure relates to a display device for a vehicle, a display method and a program.

Related Art

Patent Application Laid-Open (JP-A) No. 2020-044988 recites a display device for a vehicle that, when a lane change is conducted by autonomous driving (driving control) of the vehicle, displays information relating to the lane change.

This display device for a vehicle displays an image of an arrow or the like showing a direction from a lane in which the vehicle is running to a lane of the intended change. The display device for a vehicle displays the image of the arrow in different forms in states before and after the lane change is started. Thus, a vehicle occupant may be aware of the lane change destination lane, the state before the lane change starts and the state after the lane change starts.

However, with the technology recited in JP-A No. 2020-044988, a vehicle occupant may not be aware of whether or not the vehicle can perceive conditions of the lane change destination lane. As a result, the vehicle occupant may feel unsafe during the lane change.

SUMMARY

In consideration of the matter described above, the present disclosure is to provide a display device for a vehicle, a display method and a program that may provide a sense of safety to a vehicle occupant when a lane change is conducted by autonomous driving of the vehicle.

A display device for a vehicle according to a first aspect of the present disclosure includes: a display section provided in a cabin of a vehicle that is capable of autonomous driving; and a control section that, before conducting a lane change by autonomous driving from a first lane in which the vehicle is running to a second lane that is distinct from the first lane, causes the display section to display a lane display corresponding to the first lane and the second lane and a confirmation display relating to confirmation of a condition of the second lane.

In the display device for a vehicle according to the first aspect, the display section is provided in the vehicle cabin. The display device for a vehicle also includes the control section. Before the vehicle changes lane by autonomous driving from a first lane in which the vehicle is running to a second lane that is distinct from the first lane, the control section causes the display unit to display the lane display corresponding to the first lane and the second lane. Therefore, by looking at the display section, a vehicle occupant may identify the second lane that is the lane change destination.

The control section causes the display section to display the confirmation display relating to confirmation of the condition of the second lane. Therefore, by seeing the display unit, the vehicle occupant may understand that the condition of the second lane has been confirmed by the vehicle before the lane change. Thus, the vehicle occupant may be provided with a sense of safety.

The meaning of the term "autonomous driving" as used herein is intended to include a running mode of the vehicle in which some or all of operations of acceleration, braking, direction indication, steering and the like are conducted autonomously.

In a display device for a vehicle according to a second aspect of the present disclosure, in the configuration recited in the first aspect, the control section causes the display section to display the confirmation display regardless of whether or not another vehicle that is distinct from the vehicle is present in the second lane.

In the display device for a vehicle according to the second aspect, the confirmation display is displayed at the display unit regardless of whether or not there is another vehicle in the second lane. Therefore, by seeing the display unit, the vehicle occupant may understand that the condition of the second lane has been confirmed, regardless of a state of congestion of the road. Thus, the vehicle occupant may be provided with an even greater sense of safety.

In a display device for a vehicle according to a third aspect of the present disclosure, in the configuration recited in the first aspect or the second aspect, the control section causes the display section to display a first confirmation display as the confirmation display, the first confirmation display depicting a start of acquisition of vicinity information including the condition of the second lane.

In the display device for a vehicle according to the third aspect, by seeing the first confirmation display, the vehicle occupant may understand that the vehicle is acquiring vicinity information before the lane change. Thus, the vehicle occupant may be provided with a sense of safety.

In a display device for a vehicle according to a fourth aspect of the present disclosure, in the configuration recited in any one of the first to third aspects, the control section causes the display section to display a second confirmation display as the confirmation display, the second confirmation display depicting a goal position of the vehicle after the lane change.

In the display device for a vehicle according to the fourth aspect, by seeing the second confirmation display, the vehicle occupant may understand that the vehicle has confirmed the goal position after the lane change. Thus, the vehicle occupant may be provided with a sense of safety.

In a display device for a vehicle according to a fifth aspect of the present disclosure, in the configuration recited in the first aspect, after the first confirmation display is displayed, the control section causes the display section to display a second confirmation display depicting a goal position of the vehicle after the lane change.

In the display device for a vehicle according to the fifth aspect, the second confirmation display is displayed after the first confirmation display. Therefore, by looking at the display section, the vehicle occupant may understand the progress of the vehicle in deciding the goal position while checking the condition of the lane change destination lane.

In a display device for a vehicle according to a sixth aspect of the present disclosure, in the configuration recited in the fifth aspect, after the first confirmation display is displayed, the control section acquires a determination result from an autonomous driving control section that determines whether or not a goal position is available based on the vicinity information, and when a determination result that a goal position is available is acquired, causes the display section to display the second confirmation display based on the determination result.

In the display device for a vehicle according to the sixth aspect, the second confirmation display is displayed when the goal position has been decided on the basis of the vicinity information. Therefore, in this display device for a vehicle, the display of the first confirmation display followed by the display of the second confirmation display at the display section may reliably reflect control steps relating to autonomous driving.

In a display device for a vehicle according to a seventh aspect of the present disclosure, in the configuration recited in any one of the fourth to sixth aspects, the control section causes the display section to display an other vehicle display superposed with the lane display, the other vehicle display corresponding to another vehicle that is distinct from the vehicle in the second lane, and the second confirmation display being displayed at a position that does not overlap with a front side or a rear side of the other vehicle display.

In the display device for a vehicle according to the seventh aspect, the other vehicle display corresponding to another vehicle in the second lane is displayed at the display unit, superposed on the lane display. The second confirmation display is displayed at a position that does not overlap with the front side or rear side of the other vehicle display. Therefore, by looking at the display section, the vehicle occupant may understand that the goal position after the lane change has been confirmed by the vehicle with consideration for the presence of other vehicles. Thus, the vehicle occupant may be provided with a sense of safety.

In a display device for a vehicle according to an eighth aspect of the present disclosure, in the configuration recited in any one of the fourth to seventh aspects, the control section causes the display section to display a third confirmation display as the confirmation display, the third confirmation display depicting that the lane change to the goal position is possible.

In the display device for a vehicle according to the eighth aspect, by seeing the third confirmation display, the vehicle occupant may understand that preparation for the lane change is ready at the vehicle side. Therefore, the vehicle occupant may be prepared for the lane change. Thus, the vehicle occupant may be provided with an even greater sense of safety before the lane change.

In a display device for a vehicle according to a ninth aspect of the present disclosure, in the configuration recited in the eighth aspect, the second confirmation display displayed at the display section is a line-shaped graphic extending in a road width direction on the lane display corresponding to the second lane, and the third confirmation display displayed at the display section is an area-shaped graphic with a predetermined size on the lane display corresponding to the second lane.

In the display device for a vehicle according to the ninth aspect, the line-shaped graphic indicates the goal position after the lane change, and the area-shaped graphic indicates that the lane change is possible. Thus, a sense of presence of the confirmation display may be progressively strengthened by the change of display from the line-shaped graphic to the area-shaped graphic. Therefore, the vehicle occupant may intuitively understand the phased confirmation operations associated with the lane change. That is, when other vehicles are running in the lane change destination lane and distances between vehicles must be thoroughly assured before the lane change, the vehicle occupant may be advised, by the display of the third confirmation display as an area-shaped graphic, that a space into which the vehicle can conduct the lane change is available in the lane being changed to. Therefore, the vehicle occupant may intuitively understand the phased confirmation operations associated with the lane change.

In a display device for a vehicle according to a tenth aspect of the present disclosure, in the configuration recited in the eighth aspect or the ninth aspect, after the second confirmation display is displayed, the control section causes the display section to display the third confirmation display depicting that the lane change to the goal position is possible.

In the display device for a vehicle according to the tenth aspect, the third confirmation display is displayed after the second confirmation display. Therefore, by looking at the display section, the vehicle occupant may understand the progress of the vehicle in confirming the possibility of the lane change to the goal position while checking the condition of the lane change destination lane.

In a display device for a vehicle according to an eleventh aspect of the present disclosure, in the configuration recited in the tenth aspect, after the second confirmation display is displayed, the control section acquires a determination result from an autonomous driving control section that determines whether or not the lane change to the goal position is possible, and when a determination result that the lane change to the goal position is possible is acquired, causes the display section to display the third confirmation display based on the determination result.

In the display device for a vehicle according to the eleventh aspect, the third confirmation display is displayed when the determination result indicating that the lane change to the destination location is possible is acquired by the autonomous driving control section. Therefore, in this display device for a vehicle, the display of the second confirmation display followed by the display of the third confirmation display at the display section may reliably reflect control steps relating to autonomous driving.

In a display device for a vehicle according to a twelfth aspect of the present disclosure, in the configuration recited in any one of the first to eleventh aspects, the control section causes the display section to delete the confirmation display and display an execution display when the vehicle is conducting the lane change to the second lane, the execution display depicting the vehicle conducting the lane change to the second lane.

According to the display device for a vehicle according to the twelfth aspect, by seeing the execution display, the vehicle occupant may understand that the lane change is being conducted. Thus, according to the display device for a vehicle, the vehicle occupant may understand the phases of confirmation of vicinity conditions by the vehicle and execution of the lane change that are associated with the lane change of the vehicle, and the vehicle occupant may understand control of the vehicle associated with the lane change in more detail. Thus, the vehicle occupant may be provided with a sense of safety.

In a display device for a vehicle according to a thirteenth aspect of the present disclosure, in the configuration recited in any one of the first to twelfth aspects, the display section is at least one of an instrument display of an instrument display apparatus provided at an instrument panel to the vehicle front of a driver seat or a projection screen at the vehicle upper side of the instrument display, which projection screen is projected onto by a head-up display device.

According to the display device for a vehicle according to the thirteenth aspect, because the display section is the instrument display provided to the vehicle front of the driver seat, the projection screen at the vehicle upper side of the instrument cluster, or the like, an occupant of the driver seat may check the display unit without greatly moving their eyeline. Therefore, because both a vista to the vehicle front side and control of the vehicle associated with the lane change may be checked easily, the vehicle occupant may be provided with an even greater sense of safety.

A display method according to a fourteenth aspect of the present disclosure includes: displaying a lane display and a confirmation display at a display section provided in a cabin of a vehicle that is capable of autonomous driving, the lane display corresponding to a first lane in which the vehicle is running and a second lane that is distinct from the first lane, and the confirmation display relating to confirmation of a condition of the second lane; and conducting a lane change by autonomous driving from the first lane to the second lane, the lane display and the confirmation display being displayed before the lane change is conducted.

With the display method according to the fourteenth aspect, as described above, a vehicle occupant may be provided with a sense of safety when a lane change is conducted by autonomous driving of the vehicle.

A program according to a fifteenth aspect of the present disclosure causes a computer to execute processing including: displaying a lane display and a confirmation display at a display section provided in a cabin of a vehicle that is capable of autonomous driving, the lane display corresponding to a first lane in which the vehicle is running and a second lane that is distinct from the first lane, and the confirmation display relating to confirmation of a condition of the second lane; and conducting a lane change by autonomous driving from the first lane to the second lane, the lane display and the confirmation display being displayed before the lane change is conducted.

With the program according to the fifteenth aspect, as described above, a vehicle occupant may be provided with a sense of safety when a lane change is conducted by autonomous driving of the vehicle.

According to the present disclosure, a vehicle occupant may be provided with a sense of safety when a lane change is conducted by autonomous driving of a vehicle.

BRIEF DESCRIPTION OF THE DRAWINGS

Exemplary embodiments of the present disclosure will be described in detail based on the following figures, wherein:

FIG. 9 is a diagram showing a display example of an intended running route displayed at the first display unit;

FIG. 10 is a flowchart showing an example of a flow of display processing according to the exemplary embodiment; and FIG. 11 is a flowchart showing an example of a flow of lane change display processing according to the exemplary embodiment.

DETAILED DESCRIPTION

Figure 1:
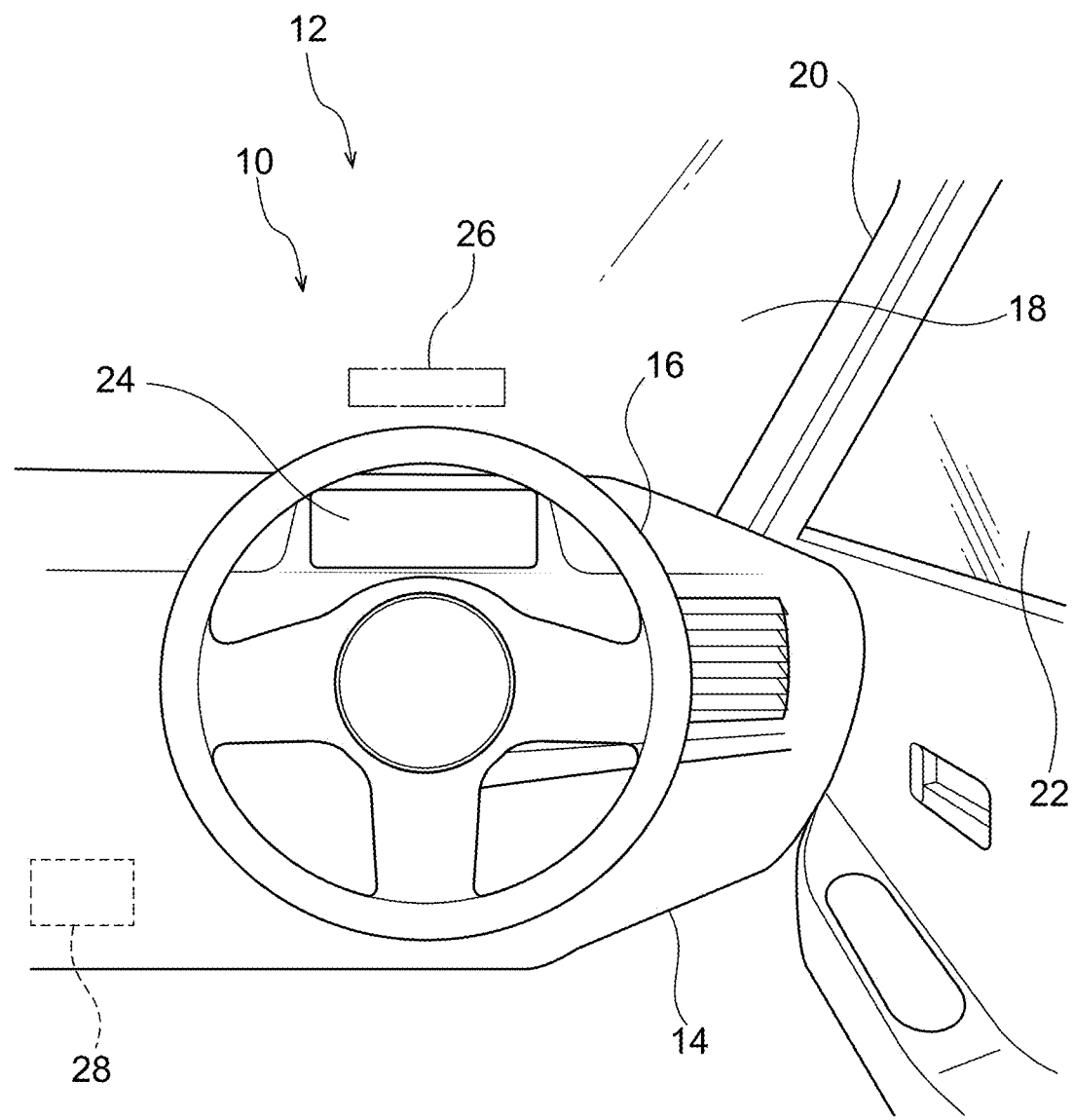
FIG. 1 is a schematic diagram of a front portion of a cabin interior of a vehicle in which a display device for a vehicle according to an exemplary embodiment is employed, viewed from the vehicle rear side.

A display device for a vehicle 10 according to an exemplary embodiment is employed in a vehicle 12, which is described with reference to the drawings. As an example, the vehicle 12 according to the present exemplary embodiment is configured to be switchable between autonomous driving and manual driving. The meaning of the term "autonomous driving" as used herein is intended to include a running mode of the vehicle in which some or all of operations of acceleration, braking, direction indication, steering and the like are conducted autonomously. The meaning of the term "manual driving" is intended to include a running mode of the vehicle in which a driver executes all driving operations (operations of acceleration, braking, direction indication, steering and the like). As shown in FIG. 1, an instrument panel 14 is provided at a front portion of a cabin interior of the vehicle 12.

The instrument panel 14 extends in the vehicle width direction, and a steering wheel 16 is provided at the vehicle right side of the instrument panel 14. That is, the present exemplary embodiment is an example of a right-hand drive car in which the steering wheel 16 is provided at the right side and a driver seat is set at the vehicle right side.

A windshield glass 18 is provided at a front end portion of the instrument panel 14. The windshield glass 18 extends in the vehicle vertical direction and the vehicle width direction, dividing the cabin interior from the cabin exterior.

A vehicle right side end portion of the windshield glass 18 is fixed to a vehicle right side front pillar 20. The front pillar 20 extends in the vehicle vertical direction, and the windshield glass 18 is fixed to a vehicle width direction inner side end portion of the front pillar 20. A front end portion of a front side glass 22 is fixed to a vehicle width direction outer side end portion of the front pillar 20. A vehicle left side end portion of the windshield glass 18 is fixed to a vehicle left side front pillar, which is not shown in the drawings.

A first display unit 24 that serves as a display section is provided at the instrument panel 14. The first display unit 24 is constituted by an instrument display provided at the instrument panel 14 to the vehicle front of the driver seat. The instrument display structures a portion of an instrument display apparatus, which is not shown in the drawings, connected to various instruments installed in the vehicle 12. The first display unit 24 is provided at a location within a field of view of the driver in the state in which the eyeline of the driver is oriented to the vehicle front.

A second display unit 26 is provided at the windshield glass 18. The second display unit 26 is provided at the vehicle upper side relative to the first display unit 24. The second display unit 26 is constituted by a projection screen that is projected onto by a head-up display (HUD) device 44 (see FIG. 2). Specifically, the head-up display device 44 is provided at the vehicle front side relative to the instrument panel 14, and the head-up display device 44 is structured to project images onto the second display unit 26 of the windshield glass 18.

-Hardware Structures of the Display Device for a Vehicle 10-

Figure 2:
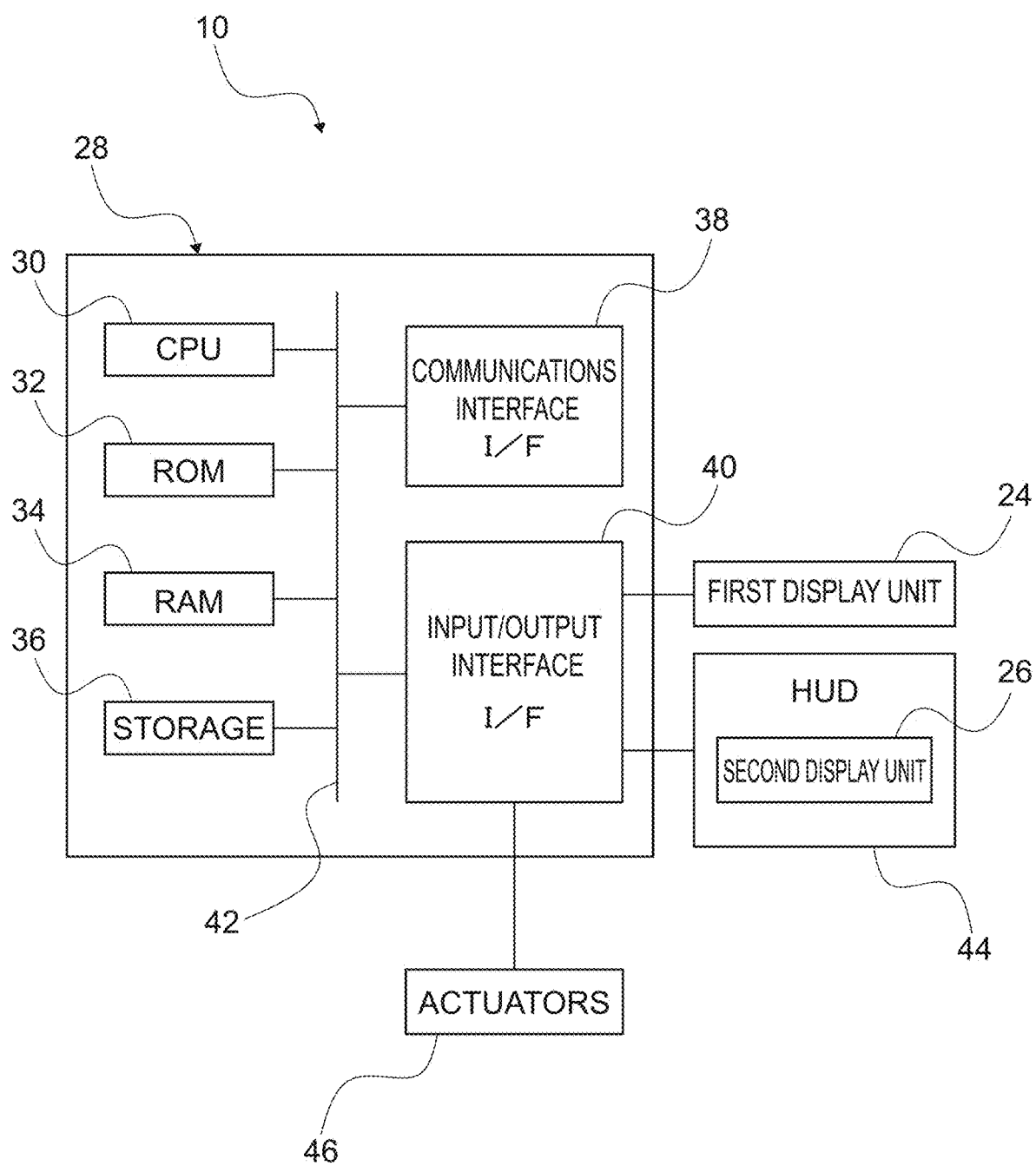
FIG. 2 is a block diagram showing hardware structures of the display device for a vehicle according to the exemplary embodiment.

An electronic control unit (ECU) 28 that serves as a control section is provided at the vehicle 12. FIG. 2 is a block diagram showing hardware structures of the display device for a vehicle 10. As shown in FIG. 2, the ECU 28 of the display device for a vehicle 10 includes a central processing unit (CPU) 30, read-only memory (ROM) 32, random access memory (RAM) 34, storage 36, a communications interface 38 and an input/output interface 40. These structures are connected to be capable of communicating with one another via a bus 42. The CPU 30 is an example of a processor, and the RAM 34 is an example of memory.

The CPU 30 is a central arithmetic processing unit that executes various programs and controls respective parts. That is, the CPU 30 reads a program from the ROM 32 or the storage 36, and executes the program using the RAM 34 as a workspace. The CPU 30 performs control of the structures described above and various kinds of computational processing in accordance with programs recorded in the ROM 32 or the storage 36.

The ROM 32 stores various programs and various kinds of data. The RAM 34 serves as a workspace, temporarily memorizing programs and data. The storage 36 includes a hard disk drive (HDD) or solid state drive (SSD). The storage 36 stores various programs, including an operating system, and various kinds of data. In the present exemplary embodiment, the ROM 32 or the storage 36 stores a program for implementing display processing, and various kinds of data and the like.

The communications interface 38 is an interface for the display device for a vehicle 10 to communicate with a server and other equipment, which are not shown in the drawings. The communications interface 38 employs a standard such as, for example, Ethernet (registered trademark), LTE, FDDI, Wi-Fi (registered trademark) or the like.

The input/output interface 40 is connected with the first display unit 24, the head-up display device 44 that projects images onto the second display unit 26, and actuators 46. The actuators 46 include a steering actuator, an accelerator actuator and a brake actuator. The steering actuator conducts steering of the vehicle 12. The accelerator actuator conducts acceleration of the vehicle 12. The brake actuator conducts deceleration of the vehicle 12 by controlling a brake. Sensors, a GPS device and the like for allowing autonomous driving of the vehicle 12, which are not shown in the drawings, are connected to the input/output interface 40.

-Functional Structures of the Display Device for a Vehicle 10-

The display device for a vehicle 10 uses the hardware resources described above to realize various functions. The functional structures realized by the display device for a vehicle 10 are described with reference to FIG. 3.

Figure 3:
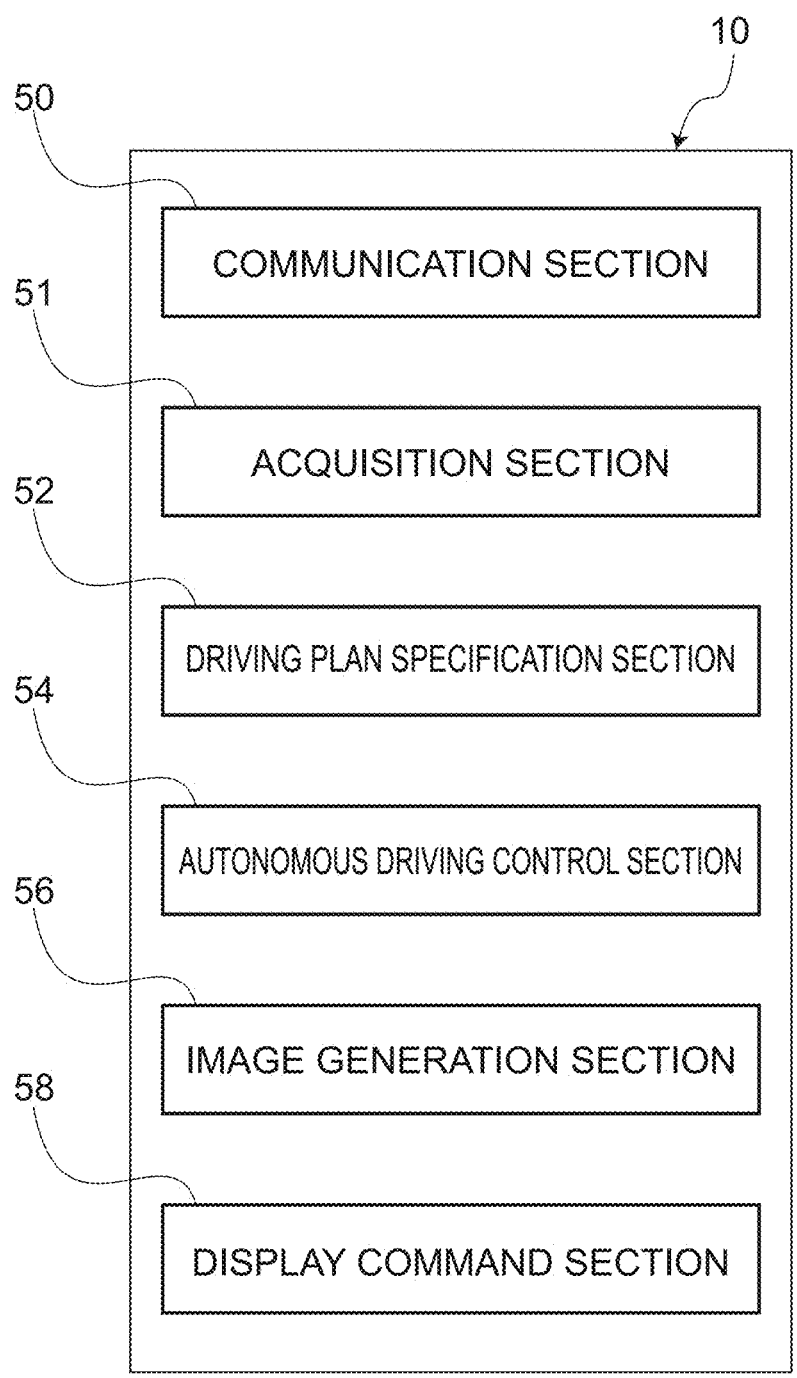
FIG. 3 is a block diagram showing functional structures of the display device for a vehicle according to the exemplary embodiment.

As shown in FIG. 3, the display device for a vehicle 10 includes, as functional structures, a communication section 50, an acquisition section 51, a driving plan specification section 52, an autonomous driving control section 54, an image generation section 56, a display command section 58 and a display emphasis section 60. These functional structures are realized by the CPU 30 reading and executing a program memorized in the ROM 32 or the storage 36.

The communication section 50 sends and receives data to and from the external server and other equipment via the communications interface 38. For example, the communication section 50 sends and receives data such as map data, traffic data and the like stored in a server. The communication section 50 is also configured to conduct vehicle-to-vehicle communications with vehicles in the vicinity.

Via the input/output interface 40, the acquisition section 51 acquires a running environment of the vehicle 12 that serves as vicinity information from external sensors, which are not shown in the drawings. The external sensors include cameras that image predetermined ranges, millimeter-wave radar that transmits probing waves in a predetermined range, and lidar (light detection and ranging/laser imaging detection and ranging) that scans a predetermined range. The vicinity information includes, for example, a width of a road on which the vehicle 12 is running, other vehicles running near the vehicle 12, obstacles and so forth.

The driving plan specification section 52 specifies a driving plan of the vehicle 12. More specifically, a destination location is entered by a vehicle occupant and the driving plan specification section 52 specifies a driving plan from a current location to the destination location.

The autonomous driving control section 54 causes autonomous driving of the vehicle 12 in accordance with the specified driving plan, taking account of position information and environment information of the vicinity of the vehicle 12. More specifically, the vehicle 12 is autonomously driven by control of the actuators 46.

The image generation section 56 generates images for display at the first display unit 24. In the present exemplary embodiment in particular, the image generation section 56 displays confirmation displays at the first display unit 24 when a lane change of the vehicle 12 is to be conducted by autonomous driving in accordance with the driving plan specified by the driving plan specification section 52. The confirmation displays are displays relating to confirmation of conditions in a lane change destination lane. The confirmation displays include a first confirmation display P1, a second confirmation display P2 and a third confirmation display P3, which are described below.

The display command section 58 includes a function for displaying images generated by the image generation section 56 at the first display unit 24, and a function for deleting images displayed at the first display unit 24. Below, functions of the image generation section 56 and display command section 58 are described with reference to FIG. 4 to FIG. 9.

Figure 4:
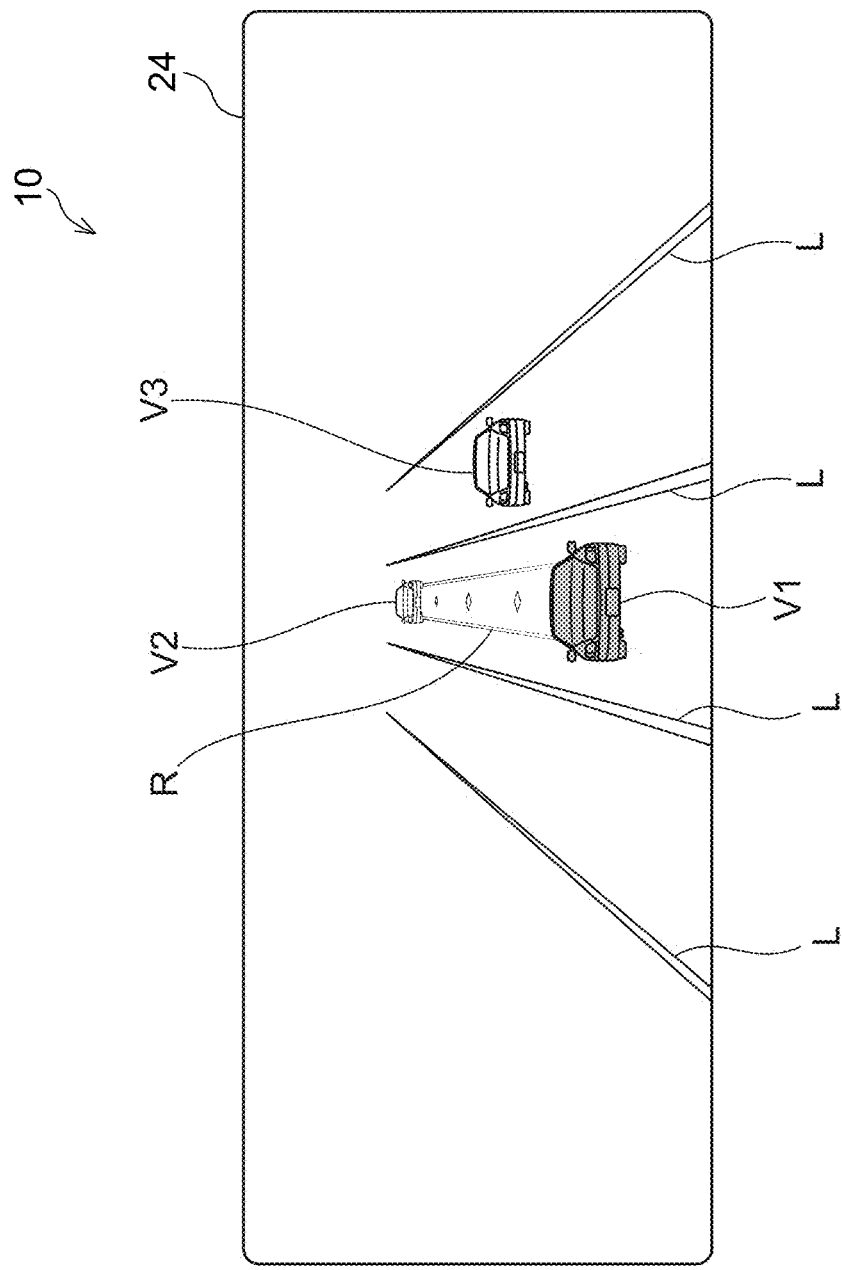
FIG. 4 is a diagram showing a display example of a first display unit that serves as a display section according to the exemplary embodiment.

As shown in FIG. 4, lane displays L relating to the shape of a road and lane information, a present vehicle display V1, and other vehicle displays V2 and V3 are displayed at a central portion of a display region of the first display unit 24. The lane displays L are images representing a lane in which the present vehicle is running and lanes to which the present vehicle may change from the lane in which the present vehicle is running. The present vehicle display V1 is an image representing the present vehicle. The other vehicle displays V2 and V3 are images representing vehicles running in the vicinity of the present vehicle, which are other vehicles distinct from the present vehicle. Looking at the display example in FIG. 4, it can be seen from the lane displays L, the present vehicle display V1 and the other vehicle displays V2 and V3 that the present vehicle is running along the central lane of three running lanes. It can also be seen that the other vehicles are running diagonally forward-right of the present vehicle and in front of the present vehicle. The lane displays L, the present vehicle display V1 and the other vehicle displays V2 and V3 are respectively displayed on the basis of information detected from any or a combination of the GPS device, map data, and the various sensors installed in the vehicle 12. For example, the position of the present vehicle may be detected by the GPS device installed in the vehicle 12. As sensors that detect the vicinity vehicles, sensors such as stereo cameras, an ultrasonic sensor, the millimeter-wave radar, laser radar and the like may be used in combination. Alternatively, the position of the present vehicle and the positions of vehicles in the vicinity may be identified by vehicle-to-vehicle communications with the vehicles in the vicinity.

An intended running route R of the present vehicle is displayed superposed with the lane displays L at the central portion of the display region of the first display unit 24. The intended running route R is an image schematically showing a route of the vehicle 12 that is predicted on the basis of the driving plan specified by the driving plan specification section 52. The intended running route R is shown as, for example, a belt-shaped graphic extending along the lane displays L. Plural dots are displayed in perspective, disposed at equally spaced positions on the route.

Now, confirmation displays that are displayed before a lane change of the vehicle 12 is conducted by autonomous driving are described in specific terms with reference to FIG. 5 to FIG. 8. As an example, these drawings illustrate a situation in which the present vehicle conducts a lane change from the central lane of the three running lanes to the right side lane. In the present exemplary embodiment, as examples of the confirmation displays, the first confirmation display P1, second confirmation display P2 and third confirmation display P3 are displayed.

Figure 5:
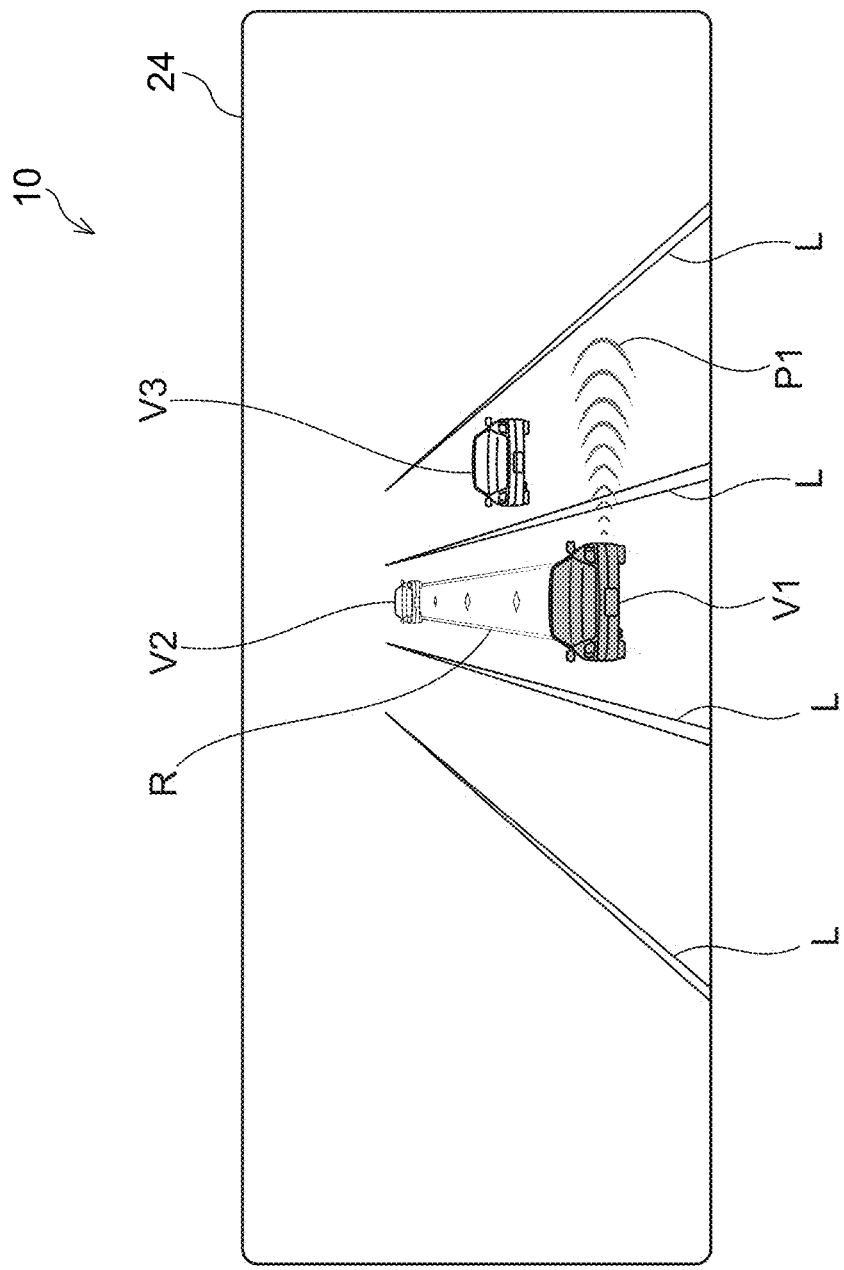
FIG. 5 is a view showing an example of a first confirmation display displayed at the first display unit.

In FIG. 5, when a lane change of the vehicle 12 is intended, the first confirmation display P1 of the vehicle 12 is displayed by the image generation section 56. The first confirmation display P1 is a display depicting that the vehicle 12 has started to acquire vicinity information, including conditions in the lane change destination lane (in FIG. 5, the right side lane). The first confirmation display P1 is displayed superposed on the corresponding lane display L between the central lane in which the vehicle 12 is running and the right side lane. The first confirmation display P1 is an image representing a wave pattern spreading radially toward the right side lane from the present vehicle display V1 in the central lane. The first confirmation display P1 depicts that vicinity information to the right side relative to the present vehicle is being acquired, focusing on conditions in the right side lane. With a view to showing the direction of the lane change clearly, the first confirmation display P1 is preferably an animation moving from the present vehicle display V1 toward the right side lane, but may be a still image.

Figure 6:
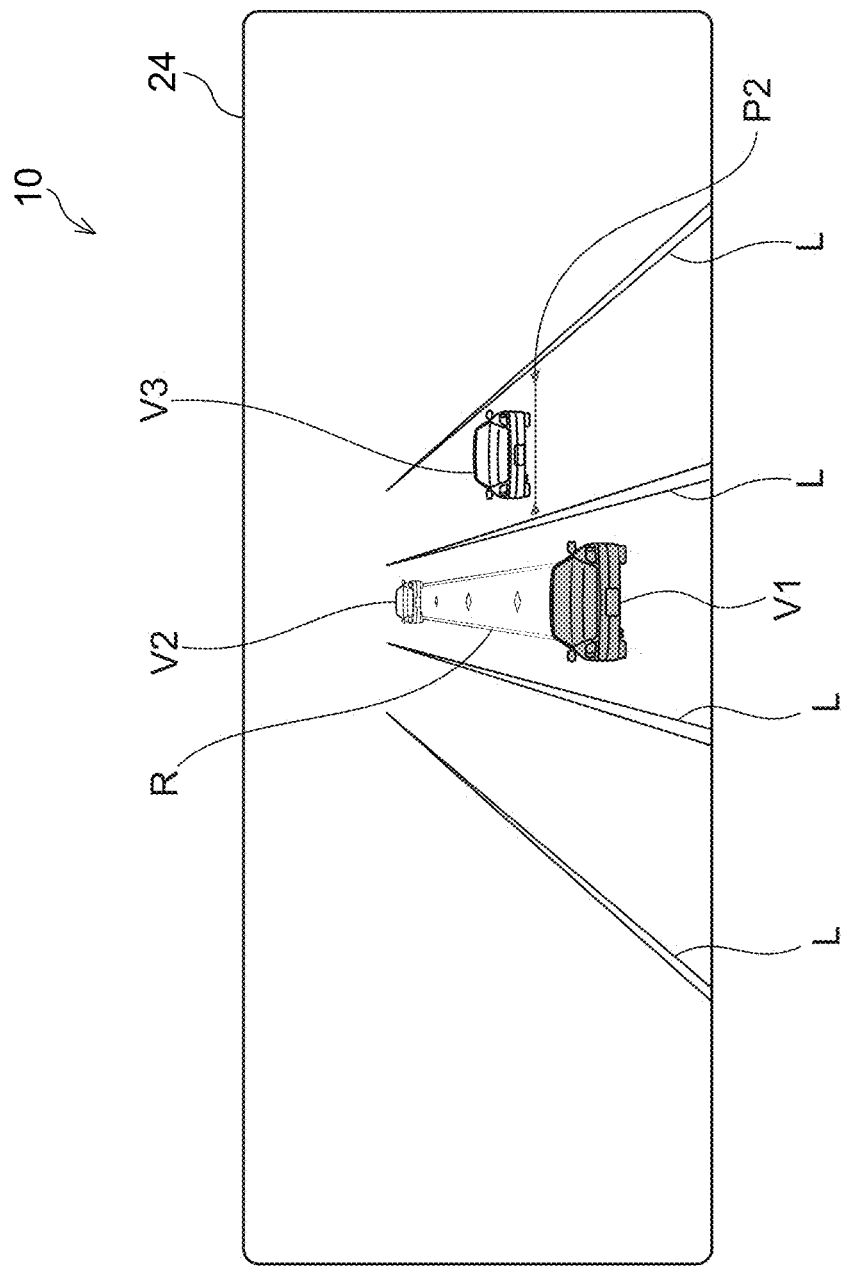
FIG. 6 is a view showing an example of a second confirmation display displayed at the first display unit.
Figure 7:
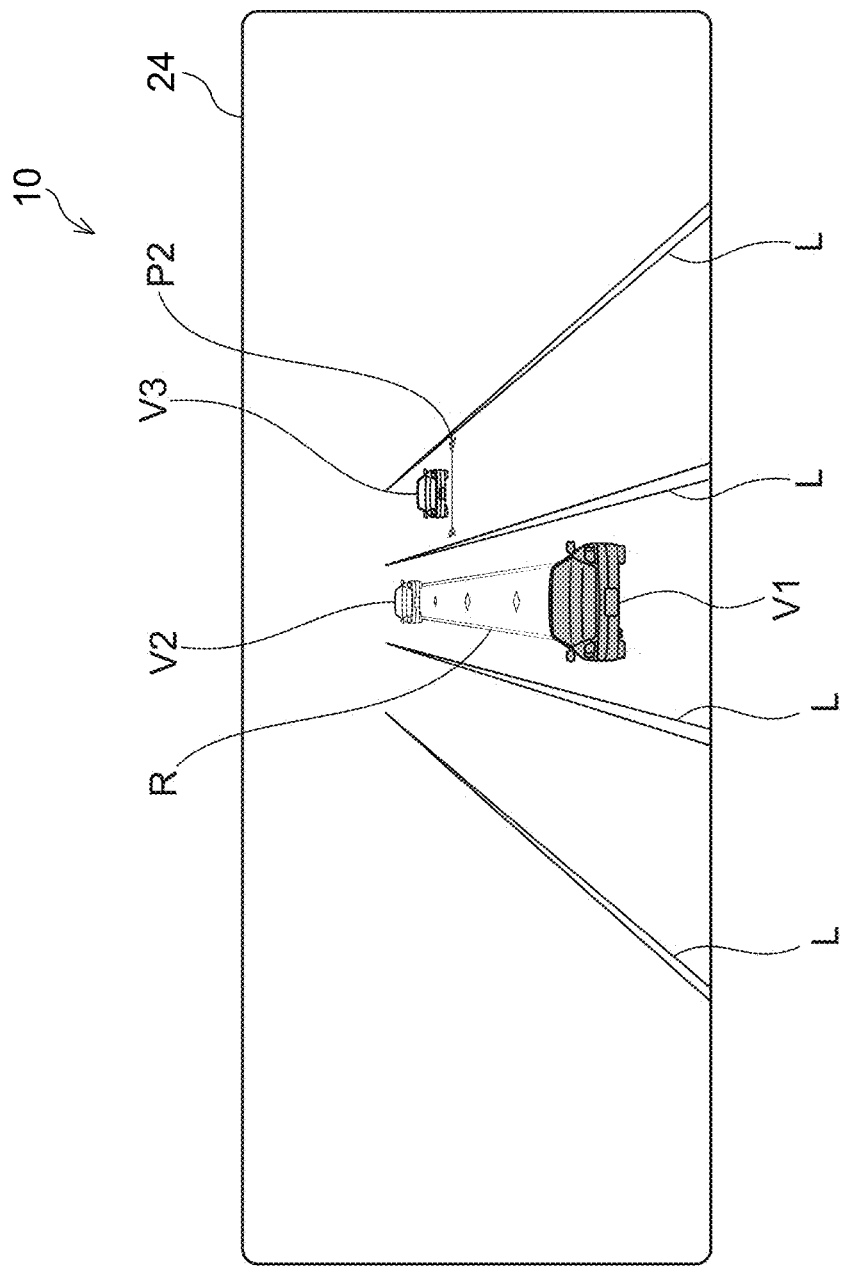
FIG. 7 is a diagram showing an example in which the second confirmation display shown in FIG. 6 moves in accordance with movement of an other vehicle display.

In FIG. 6 and FIG. 7, the second confirmation display P2 of the vehicle 12 is displayed by the image generation section 56. The second confirmation display P2 displays a goal position of the vehicle 12 after the lane change. The goal position after the lane change is computed by the autonomous driving control section 54 on the basis of the vicinity information acquired by the acquisition section 51. On the basis of information from the acquisition section 51 and the autonomous driving control section 54, the image generation section 56 displays the second confirmation display P2 at a corresponding position of the display region of the first display unit 24.

The second confirmation display P2 is displayed superposed with the lane displays L corresponding to the lane change destination lane. The second confirmation display P2 is an image of a line-shaped graphic extending in the road width direction of the lane change destination lane. Respective triangular shapes emphasizing length direction end portions of the line-shaped graphic are disposed at both ends of the line-shaped graphic. When another vehicle is running in the lane change destination lane, the second confirmation display P2 is displayed at a position that does not overlap with the other vehicle display corresponding to the another vehicle. Looking at the display example in FIG. 6 and FIG. 7, the goal position after the lane change is at the rear side of the another vehicle running in the right side lane diagonally forward-right of the present vehicle. The second confirmation display P2 is displayed at the rear side of the other vehicle display V3, at a position that does not overlap with the other vehicle display V3. If the other vehicle display V3 is relatively moving away from (or approaching) the present vehicle display V1, the second confirmation display P2 is displayed so as to move in accordance with movement of the other vehicle display V3. Because of this specification, even when the lane change destination lane is crowded, relationships between other vehicles running near the present vehicle and the goal position after the lane change may be displayed in a form that is easy to understand. In the display example shown in FIG. 6 and FIG. 7, the second confirmation display P2 is displayed at the rear side of the other vehicle display V3, but this is not limiting. The second confirmation display may be displayed at the front side of the other vehicle display V3. The first confirmation display P1 is deleted when the second confirmation display P2 is displayed at the first display unit 24.

Figure 8:
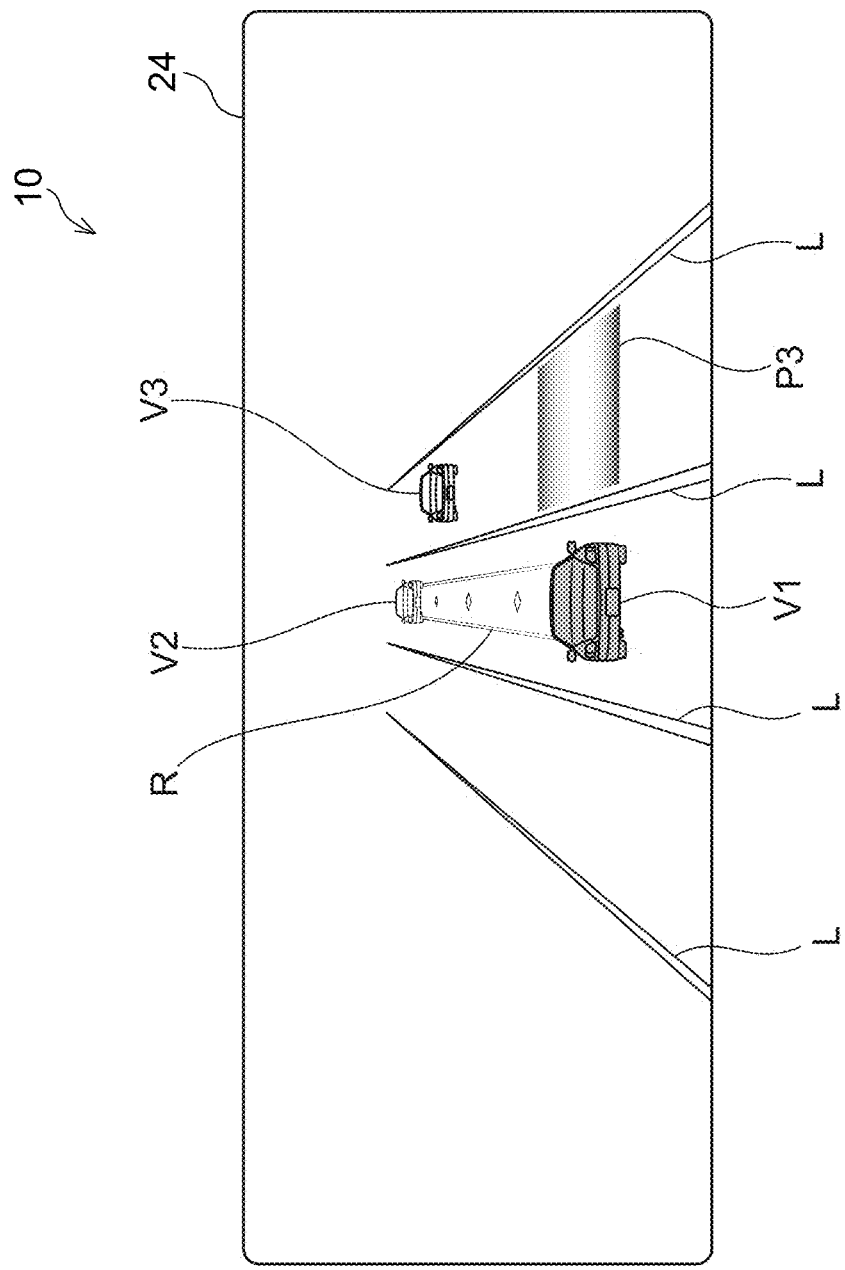
FIG. 8 is a view showing an example of a third confirmation display displayed at the first display unit.

In FIG. 8, the third confirmation display P3 of the vehicle 12 is displayed by the image generation section 56. The third confirmation display P3 depicts that the lane change to the goal position after the lane change is possible. A determination as to whether the lane change to the goal position is possible or not is made by the autonomous driving control section 54. The third confirmation display P3 is a quadrilateral area-shaped image whose longest direction is in the direction of extension of the lane. The third confirmation display P3 is displayed in a form with a predetermined area in line with the lane displays L. Thus, the third confirmation display P3 has greater presence in the first display unit 24 than the second confirmation display P2. Therefore, a vehicle occupant can easily understand visually that phased confirmation operations associated with the lane change are progressing. Looking at FIG. 8, the quadrilateral third confirmation display P3 is displayed at the rear side of the other vehicle display V3 with a size corresponding to a single vehicle display. Therefore, a vehicle occupant may instinctively verify that space for the present vehicle to run in is assured at the rear side of the another vehicle running in the right side lane. The second confirmation display P2 is deleted when the third confirmation display P3 is displayed at the first display unit 24.

As described above, before the vehicle 12 changes lane, the first confirmation display P1, second confirmation display P2 and third confirmation display P3 are displayed in the first display unit 24. These displays show to a vehicle occupant that confirmation of conditions in the lane change destination lane proceeds in steps through three phases: "starting confirmation", "confirming a goal position" and "confirmation that distances from other vehicles are assured at the goal position".

In FIG. 9, the intended running route R is displayed by the image generation section 56, showing a running route from the lane in which the present vehicle is running to the lane change destination lane. This intended running route R is equivalent to an "execution display" of the present disclosure. Looking at FIG. 9, the intended running route R curves from the middle lane to the right side lane. Thus, the lane change of the present vehicle from the middle lane to the right side lane can be seen. All the confirmation displays are deleted when the intended running route R is displayed at the first display unit 24.

-Operation-

Now, operation of the present exemplary embodiment is described.

-Display Processing-

An example of display processing for displaying a lane change of the vehicle 12 in accordance with a driving plan is described using the flowchart shown in FIG. 10. This display processing is implemented by the CPU 30 reading a display program from the ROM 32 or storage 36, loading the display program into the RAM 34, and executing the program.

As shown in FIG. 10, in step S100, the CPU 30 makes a determination as to whether a destination location is specified. A destination location may be entered into the vehicle 12 directly by a vehicle occupant, and may be entered indirectly via a portable terminal or the like.

When the CPU 30 determines in step S100 that a destination location has been specified, the CPU 30 proceeds to the processing of step S110. Alternatively, when the CPU 30 determines in step S100 that a destination location has not been specified, the CPU 30 ends the display processing.

In step S110, the CPU 30 specifies a driving plan of the vehicle 12. More specifically, by the functioning of the driving plan specification section 52, the CPU 30 specifies a driving plan from the current location to the destination location. While specifying the driving plan, the CPU 30 may acquire and incorporate information relating to traffic conditions and accidents. The driving plan may also be specified such that more of the driving is autonomous, depending on preferences of a vehicle occupant that are entered beforehand.

In step S120, the CPU 30 makes a determination as to whether a lane change is to be conducted. More specifically, by the functioning of the driving plan specification section 52, the CPU 30 makes a determination as to whether the vehicle 12 has passed a location at which a distance to a lane change target location is less than a predetermined distance.

When the CPU 30 determines in step S120 that there is to be a lane change, the CPU 30 proceeds to the processing of step S130. Alternatively, when the CPU 30 determines in step S120 that there is to be no lane change, the CPU 30 returns to step S120 and repeats the processing thereof.

In step S130, the CPU 30 executes lane change display processing and displays various displays relating to the lane change at the first display unit 24. The lane change display processing is executed regardless of whether or not another vehicle is present in the lane change destination lane. Details of the lane change display processing are described below.

In step S140, the CPU 30 makes a determination as to whether all lane changes have been completed. More specifically, the CPU 30 makes a determination as to whether the lane changes are complete on the basis of the functioning of the autonomous driving control section 54.

When the CPU 30 determines in step S140 that the lane changes are complete, the CPU 30 ends the display processing. Alternatively, when the CPU 30 determines in step S140 that the lane changes are not complete, the CPU 30 returns to step S120 and repeats the processing.

-Lane Change Display Processing-

Now, an example of the lane change display processing is described with reference to FIG. 11. This lane change display processing is implemented by the CPU 30 reading the display program from the ROM 32 or storage 36, loading the display program into the RAM 34, and executing the program.

As shown in FIG. 11, in step S201, the CPU 30 acquires vicinity information of the vehicle 12. More specifically, by the functioning of the acquisition section 51, the CPU 30 acquires information relating to the shape and width of the road on which the vehicle 12 is running, the presence or absence of a lane into which the vehicle 12 may conduct a lane change, the presence of other vehicles running near the vehicle 12, and so forth.

In step S202, the CPU 30 displays the first confirmation display P1 at the first display unit 24. More specifically, by the functioning of the image generation section 56 and the display command section 58, the CPU 30 displays the present vehicle display V1, the other vehicle displays V2 and V3, and the first confirmation display P1 that is superposed on the lane displays L at the first display unit 24 as illustrated in FIG. 5, showing conditions in the vicinity of the vehicle 12.

In step S203, the CPU 30 makes a determination as to whether a goal position after the lane change of the vehicle 12 is available. More specifically, by the functioning of the acquisition section 51 and the autonomous driving control section 54, the CPU 30 makes a determination as to whether a predetermined space is available in the lane change destination lane near the vehicle 12.

When the CPU 30 determines in step S203 that a goal position is available, the CPU 30 proceeds to the processing of step S204. Alternatively, when the CPU 30 determines in step S203 that no goal position is available, the CPU 30 returns to step S201 and repeats the processing.

In step S204, the CPU 30 activates a timer, and then proceeds to the processing of step S205. In step S205, the CPU 30 displays the second confirmation display P2 at the first display unit 24. More specifically, by the functioning of the image generation section 56 and the display command section 58, the CPU 30 displays the second confirmation display P2 at a position corresponding with the goal position in the display region of the first display unit 24. As shown in FIG. 6 and FIG. 7, the CPU 30 deletes the first confirmation display P1 from the first display unit 24 and displays the second confirmation display P2 instead.

In step S206, the CPU 30 makes a determination as to whether the lane change of the vehicle 12 to the predetermined goal position is possible. More specifically, by the functioning of the acquisition section 51 and the autonomous driving control section 54, the CPU 30 makes a determination on the basis of the vicinity information of the vehicle 12 as to whether sufficient space is available for the vehicle 12 to conduct the lane change to the predetermined goal position. The space for which the determination is made in step S206 is, for example, larger than a predetermined space for the determination in step S203, and is a space including at least an area corresponding to the single vehicle 12 in plan view.

When the CPU 30 determines in step S206 that the lane change is possible, the CPU 30 proceeds to the processing of step S208. Alternatively, when the CPU 30 determines in step S206 that the lane change is not possible, the CPU 30 proceeds to the processing of step S207.

In step S207, the CPU 30 makes a determination as to whether a predetermined duration has passed since the activation of the timer in step S204.

When the CPU 30 determines in step S207 that the predetermined duration has passed, the CPU 30 returns to step S203, specifies a new goal position and repeats the processing. When the CPU 30 determines in step S207 that the predetermined duration has not passed, the CPU 30 returns to step S205 and continues to display the second confirmation display P2 corresponding to the predetermined goal position at the first display unit 24.

Alternatively, when the CPU 30 determines in step S206 that the lane change is possible and proceeds to step S208, the CPU 30 displays the third confirmation display P3 at the first display unit 24. More specifically, by the functioning of the image generation section 56 and the display command section 58, the CPU 30 deletes the second confirmation display P2 over the lane displays L and displays the third confirmation display P3 instead, as illustrated in FIG. 8.

In step S209, the CPU 30 executes the lane change of the vehicle 12. Then, the CPU 30 advances to the processing of step S210 and displays the execution display at the first display unit 24. More specifically, as illustrated in FIG. 9, the CPU 30 deletes the third confirmation display P3 from the first display unit 24 and displays the intended running route R that serves as the execution display. The CPU 30 completes the processing of step S210 and ends the lane change display processing.

As described above, in the display device for a vehicle 10 according to the present exemplary embodiment, before a lane change from a lane in which the vehicle 12 is running to another lane, the lane displays L corresponding to the lane in which the vehicle 12 is running and the lane change destination lane are displayed at the first display unit 24. Therefore, by looking at the display section, a vehicle occupant may identify the second lane that is the lane change destination.

Confirmation displays (P1 to P3) relating to confirmation of conditions of the lane change destination lane are displayed at the first display unit 24. Therefore, by looking at the first display unit 24, the vehicle occupant may understand that conditions of the lane change destination lane have been confirmed by the vehicle 12 before the lane change. Thus, the vehicle occupant may be provided with a sense of safety.

In the present exemplary embodiment, the confirmation displays are displayed at the first display unit 24 regardless of whether or not other vehicles are present in the lane change destination lane. Therefore, by looking at the first display unit 24, the vehicle occupant may understand that conditions of the lane change destination lane have been confirmed, regardless of a state of congestion of the road. Thus, the vehicle occupant may be provided with an even greater sense of safety.

To describe this in more specific terms, by seeing the confirmation display P1 as shown in FIG. 5, the vehicle occupant may understand that the vehicle 12 is acquiring vicinity information before the lane change. Thus, the vehicle occupant may be provided with a sense of safety.

When the vehicle occupant sees the second confirmation display P2, as illustrated in FIG. 6 and FIG. 7, the vehicle occupant may understand that the vehicle 12 has confirmed a goal position after the lane change. Thus, the vehicle occupant may be provided with a sense of safety.

The second confirmation display P2 is displayed at a position that does not overlap with the front side (or rear side) of the other vehicle display V3. Therefore, by looking at the first display unit 24, the vehicle occupant may understand that the goal position after the lane change has been confirmed by the vehicle 12 with consideration for the presence of other vehicles. Thus, the vehicle occupant may be provided with a sense of safety.

By seeing the third confirmation display P3 as illustrated in FIG. 8, the vehicle occupant may understand that preparation for the lane change is ready at the vehicle 12 side. Therefore, the vehicle occupant may be prepared for the lane change. Thus, the vehicle occupant may be provided with an even greater sense of safety before the lane change.

In the present exemplary embodiment, according to the second confirmation display P2, the line-shaped graphic depicts the goal position after the lane change, and according to the third confirmation display P3, the area-shaped graphic depicts that the lane change is possible. Thus, the sense of presence of the confirmation display may be progressively strengthened by the change of display from the line-shaped graphic to the area-shaped graphic. Therefore, the vehicle occupant may intuitively understand the phased confirmation operations associated with the lane change. That is, when other vehicles are running in the lane change destination lane and distances between vehicles must be thoroughly assured before the lane change, the vehicle occupant may be advised, by the display of the third confirmation display P3 as an area-shaped graphic, that a space into which the vehicle can conduct the lane change is available in the lane being changed to. Therefore, the vehicle occupant may intuitively understand the phased confirmation operations associated with the lane change.

In the present exemplary embodiment, by seeing the intended running route R illustrated in FIG. 9, which is the execution display, the vehicle occupant may understand that the lane change is being conducted. Thus, according to the display device for a vehicle 10, the vehicle occupant may understand the phases of confirmation of vicinity conditions by the vehicle and execution of the lane change that are associated with the lane change of the vehicle, and the vehicle occupant may understand control of the vehicle associated with the lane change in more detail. Thus, the vehicle occupant may be provided with a sense of safety.

According to the present exemplary embodiment, because the first display unit 24 is the instrument display provided to the vehicle front of the driver seat, the occupant of the driver seat may check the first display unit 24 without greatly moving their eyeline. Therefore, because both a vista to the vehicle front side and control of the vehicle 12 associated with the lane change may be checked easily, the vehicle occupant may be provided with an even greater sense of safety. The second display unit 26 that is the projection screen of the head-up display device 44 may also serve as the display section of the present disclosure, in which case the same effects may be exhibited as with the first display unit 24 of the present exemplary embodiment.

=Supplementary Descriptions=

In the exemplary embodiment described above, the display device for a vehicle 10 is provided with the functions of the acquisition section 51, the driving plan specification section 52 and the autonomous driving control section 54, but the present disclosure is not limited thus. Some or all of these functions may be provided by an alternative control device. Therefore, although environment information of the vehicle 12, determination results as to whether goal positions after lane changes are available, and determination results as to whether lane changes to goal positions are possible are acquired internally in the exemplary embodiment described above, configurations are possible in which these kinds of information and determination results are acquired via communication means from external equipment that includes the acquisition section 51, the driving plan specification section 52, the autonomous driving control section 54 and the like.

The exemplary embodiment described above is specified such that only one of the first confirmation display P1, the second confirmation display P2 and the third confirmation display P3 is displayed at the first display unit 24, but this is not limiting. Specification is possible such that one or more different types of confirmation display may be displayed at the first display unit 24 at the same time.

The confirmation displays according to the exemplary embodiment described above—the first confirmation display P1, the second confirmation display P2 and the third confirmation display P3—are merely examples. The respective confirmation displays may take various forms and may be suitably altered as required.

The display processing and lane change display processing that, in the exemplary exemplary embodiment described above, are executed by the CPU reading software (a program) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The display processing and lane change display processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiment described above, a mode is described in which the program of the display processing and lane change display processing is memorized in advance (installed) at the ROM or the storage, but this is not limiting. The program may be provided in a mode recorded on a recording medium, such as a CD-ROM (compact disc read-only memory), DVD-ROM (digital versatile disc read-only memory), USB (universal serial bus) memory or the like. Modes are also possible in which the program is downloaded from external equipment via a network.

What is claimed is:

1. A display device for a vehicle, comprising:
   a display section provided in a cabin of a vehicle that is capable of autonomous driving;
   one or more processors configured to:
      control the vehicle to drive at least partially autonomously;
      before conducting a lane change by autonomous driving from a first lane in which the vehicle is running to a second lane that is distinct from the first lane, display at the display section:
         a lane display corresponding to the first lane and the second lane, and
         a confirmation display relating to confirmation of a condition of the second lane,
      wherein the confirmation display includes an image showing a quadrilateral-shaped area and a goal position of the vehicle on the second lane after the lane change, and an area behind the goal position that encompasses an area to which the lane change is possible, and
      wherein the goal position is displayed on the display section as a line-shaped graphic extending in a road width direction over the second lane, and is displayed so as to move in accordance with movement of another vehicle.

2. The display device for a vehicle according to claim 1, wherein the one or more processors are configured to display the confirmation display at the display section regardless of whether or not another vehicle that is distinct from the vehicle is present in the second lane.

3. The display device for a vehicle according to claim 1, wherein the one or more processors are configured to display a first confirmation display at the display section as part of the confirmation display, the first confirmation display depicting a start of acquisition of vicinity information including the condition of the second lane.

4. The display device for a vehicle according to claim 3, wherein the one or more processors are configured to, after displaying the first confirmation display, display a second confirmation display at the display section, the second confirmation display depicting the goal position of the vehicle after the lane change.

5. The display device for a vehicle according to claim 4, wherein the one or more processors are configured to, after displaying the first confirmation display, acquire a determination result from an autonomous driving control section that determines whether or not the goal position is available based on the vicinity information, and, when a determination result that the goal position is available is acquired, display the second confirmation display based on the determination result.

6. The display device for a vehicle according to claim 1, wherein the one or more processors are configured to display a second confirmation display at the display section as the confirmation display, the second confirmation display depicting the goal position of the vehicle after the lane change.

7. The display device for a vehicle according to claim 6, wherein the one or more processors are configured to display another vehicle display superposed with the lane display at the display section, the other vehicle display corresponding to another vehicle that is distinct from the vehicle in the second lane, and the second confirmation display being displayed at a position that does not overlap with a front side or a rear side of the other vehicle display.

8. The display device for a vehicle according to claim 6, wherein the one or more processors are configured to display a third confirmation display at the display section as the confirmation display, the third confirmation display depicting that the lane change to the goal position is possible.

9. The display device for a vehicle according to claim 8, wherein:
   the third confirmation display displayed at the display section is an area-shaped graphic with a predetermined size on the lane display corresponding to the second lane.

10. The display device for a vehicle according to claim 8, wherein the one or more processors are configured to, after displaying the second confirmation display, display the third confirmation display depicting that the lane change to the goal position is possible at the display section.

11. The display device for a vehicle according to claim 10, wherein the one or more processors are configured to, after displaying the second confirmation display, acquire a determination result from an autonomous driving control section that determines whether or not the lane change to the goal position is possible, and, when a determination result that the lane change to the goal position is possible is acquired, display the third confirmation display based on the determination result.

12. The display device for a vehicle according to claim 1, wherein the one or more processors are configured to delete the confirmation display and display an execution display at the display section when the vehicle is conducting the lane change to the second lane, the execution display depicting the vehicle conducting the lane change to the second lane.

13. The display device for a vehicle according to claim 1, wherein the display section is at least one of:
   an instrument display of an instrument display apparatus provided at an instrument panel to a vehicle front of a driver seat, or
   a projection screen at a vehicle upper side of the instrument display, the projection screen being projected onto by a head-up display device.

14. The display device for a vehicle according to claim 1, wherein the one or more processors displays, in parallel with the confirmation display, which is the image showing a quadrilateral-shaped area, an image showing a band-shaped area showing an intended running route of the vehicle on the first lane.

15. A display method comprising:
   displaying a lane display and a confirmation display at a display section provided in a cabin of a vehicle that is capable of at least partially driving autonomously, the lane display corresponding to a first lane in which the vehicle is running and a second lane that is distinct from the first lane, and the confirmation display relating to confirmation of a condition of the second lane; and
   conducting a lane change by autonomous driving from the first lane to the second lane, the lane display and the confirmation display being displayed before the lane change is conducted,
   wherein the confirmation display includes an image showing a quadrilateral-shaped area including a goal position of the vehicle on the second lane after the lane change, and an area behind the goal position that encompasses an area to which the lane change is possible, and
   wherein the goal position is displayed on the display section as a line-shaped graphic extending in a road width direction over the second lane, and is displayed so as to move in accordance with movement of another vehicle.

16. A display device for a vehicle, comprising:
   a display section provided in a cabin of a vehicle that is capable of autonomous driving;
   one or more processors configured to:
      control the vehicle to drive at least partially autonomously;
      before conducting a lane change by autonomous driving from a first lane in which the vehicle is running to a second lane that is distinct from the first lane, display at the display section:
         a lane display corresponding to the first lane and the second lane, and
         a confirmation display relating to confirmation of a condition of the second lane,
   wherein the confirmation display includes a second confirmation display and a third confirmation display that have different shapes, the second confirmation display depicting a goal position of the vehicle on the second lane after the lane change, and the third confirmation display depicting a quadrilateral-shaped area within the second lane that encompasses an area to which the lane change is possible,
   wherein the goal position is displayed on the display section as a line-shaped graphic extending in a road width direction over the second lane, and is displayed so as to move in accordance with movement of another vehicle.

17. The display device for the vehicle according to claim 16, wherein the one or more processors are configured to control the second confirmation display to be deleted after display of the third confirmation display.

* * * * *